(12) United States Patent
Gude et al.

(10) Patent No.: US 9,148,837 B2
(45) Date of Patent: Sep. 29, 2015

(54) METHODS AND DEVICES FOR PARALLEL PAGE DECODING FROM NEIGHBORING CELLS

(71) Applicant: Qualcomm Incorporated, San Diego, CA (US)

(72) Inventors: Venkata Siva Prasad Gude, Hyderabad (IN); Bhaskara V. Batchu, Hyderabad (IN); Debesh Kumar Sahu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 13/758,418

(22) Filed: Feb. 4, 2013

(65) Prior Publication Data

US 2013/0337809 A1    Dec. 19, 2013

Related U.S. Application Data

(60) Provisional application No. 61/660,761, filed on Jun. 17, 2012.

(51) Int. Cl.
*H04W 36/18* (2009.01)
*H04B 1/7117* (2011.01)
(Continued)

(52) U.S. Cl.
CPC .............. *H04W 36/18* (2013.01); *H04B 1/7117* (2013.01); *H04B 2201/70702* (2013.01); *H04J 11/0093* (2013.01); *H04W 48/20* (2013.01)

(58) Field of Classification Search
CPC .... H04W 36/18; H04W 48/20; H04B 1/7117; H04B 2201/70702; H04J 11/0093

USPC ............ 455/458, 435.2, 448, 443, 434, 432.1
See application file for complete search history.

(56) References Cited

U.S. PATENT DOCUMENTS

| 5,920,549 A | * | 7/1999 | Bruckert et al. ............... 370/331 |
| 2004/0166882 A1 | * | 8/2004 | He ................................. 455/460 |

(Continued)

FOREIGN PATENT DOCUMENTS

| EP | 0785692 A2 | 7/1997 |
| EP | 1081980 A1 | 3/2001 |

(Continued)

OTHER PUBLICATIONS

International Search Report and Written Opinion—PCT/US2013/044776—ISA/EPO—Sep. 24, 2013.

(Continued)

*Primary Examiner* — Brandon Miller
(74) *Attorney, Agent, or Firm* — QUALCOMM IP Department; James Hunt Yancey, Jr.

(57) ABSTRACT

Various features and aspects of the present disclosure are adapted to facilitate improved reception of page messages at an access terminal operable in a wireless communication system. When the access terminal is in a region where two or more cells overlap, if the access terminal is moving away from the coverage area of an active cell and moving towards the coverage area of a neighbor cell, the access terminal may miss an incoming page message transmitted from its serving cell. Thus, the access terminal may dedicate fingers of a rake receiver to listen to paging information transmitted from one or more neighbor cells, decoding this information if a page decoding operation corresponding to the active cell fails. Other aspects, embodiments, and features are also claimed and described.

20 Claims, 8 Drawing Sheets

(51) Int. Cl.
*H04J 11/00* (2006.01)
*H04W 48/20* (2009.01)

(56) References Cited

U.S. PATENT DOCUMENTS

2009/0182871 A1 7/2009 Gupta et al.
2010/0159929 A1* 6/2010 Homchaudhuri ............. 455/436
2010/0330992 A1 12/2010 Bhattacharjee et al.
2011/0111761 A1 5/2011 Luo et al.
2011/0287772 A1 11/2011 Park et al.

FOREIGN PATENT DOCUMENTS

EP 1081980 A1 * 3/2001 ............... H04Q 7/38
GB 2322046 8/1998
WO WO-2012064600 A1 5/2012

OTHER PUBLICATIONS

Choi S., et al., "Finger Assignment Schemes for Rake Receivers with Multi-way Soft Handover," IEEE Communications Society, WCNC 2007 Proceedings, 2007, 5 pages.

* cited by examiner

METHODS AND DEVICES FOR PARALLEL PAGE DECODING FROM NEIGHBORING CELLS

PRIORITY CLAIM

The present application for patent claims priority to Provisional Application No. 61/660,761 entitled "Methods and Devices for Parallel Page Decoding from Neighboring Cells," filed Jun. 17, 2012 and assigned to the assignee hereof, hereby expressly incorporated by reference herein as if fully set forth below and for all applicable purposes.

TECHNICAL FIELD

The technology discussed in this patent application relates generally to wireless communication, and more specifically to methods and devices for receiving page messages directed to wireless devices in a cellular wireless communication system. Some embodiments can be used to ensuring that calls are not dropped or missed during a dynamic wireless environment.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

As the demand for mobile broadband access continues to increase, research and development continue to advance the wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various features and aspects of the present disclosure are adapted to facilitate an improved reception of page messages at an access terminal operable in a wireless communication system. That is, when a conventional access terminal is in a region where two or more cells overlap, if the access terminal is moving away from the coverage area of its serving cell and moving towards the coverage area of a neighbor cell, the access terminal may miss an incoming page message transmitted from its serving cell.

However, even though the access terminal conventionally only decodes page messages transmitted from its serving cell, the network generally sends page messages not only to the serving cell, but also sends the page messages to neighbor cells. Thus, in an aspect of the present disclosure, the access terminal may take advantage of this fact by processing symbols received from one or more neighbor cells (e.g., the strongest neighbor path) to decode page messages from the one or more neighbor cells, in addition to decoding the page message from the serving cell.

In one aspect, a method of wireless communication operable at an access terminal is disclosed. Accordingly, the method includes allocating a second receiver in the access terminal to track a neighboring cell while a first receiver in the access terminal is configured to receive paging information from an active cell, utilizing the second receiver, receiving paging information from the neighboring cell and if the access terminal fails to decode a page message from the received paging information from the active cell, decoding the page message from the received paging information from the neighboring cell. The access terminal is in an idle mode.

In another aspect, the disclosure provides an apparatus for wireless communication. The apparatus includes a communication interface, a storage medium and a processing circuit. The processing circuit is configured to perform an operation. The operation includes allocating a second receiver in the access terminal to track a neighboring cell while a first receiver in the access terminal is configured to receive paging information from an active cell, utilizing the second receiver, receiving paging information from the neighboring cell and if the access terminal fails to decode a page message from the received paging information from the active cell, decoding the page message from the received paging information from the neighboring cell. The access terminal is in an idle mode.

In yet another aspect, the disclosure provides a computer readable storage medium containing a program which, when executed by a processor, perform an operation of wireless communication at an access terminal. The operation includes allocating a second receiver in the access terminal to track a neighboring cell while a first receiver in the access terminal is configured to receive paging information from an active cell, utilizing the second receiver, receiving paging information from the neighboring cell and if the access terminal fails to decode a page message from the received paging information from the active cell, decoding the page message from the received paging information from the neighboring cell. The access terminal is in an idle mode.

In yet another aspect, the disclosure provides an apparatus for wireless communication including means for communicating with a plurality of cells, means for storing program and data and means for performing an operation. The operation includes allocating a second receiver in the access terminal to track a neighboring cell while a first receiver in the access terminal is configured to receive paging information from an active cell, utilizing the second receiver, receiving paging information from the neighboring cell and if the access terminal fails to decode a page message from the received paging information from the active cell, decoding the page message from the received paging information from the neighboring cell. The access terminal is in an idle mode.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below for CDMA and 3rd Generation Partnership Project 2 (3GPP2) 1× protocols and systems, and related terminology may be found in much of the following description. However, those of ordinary skill in the art will recognize that one or more aspects of the present disclosure may be employed and included in one or more other wireless communication protocols and systems, including but not limited to those described by 3GPP GSM, UMTS, and LTE standards.

Figure 1:
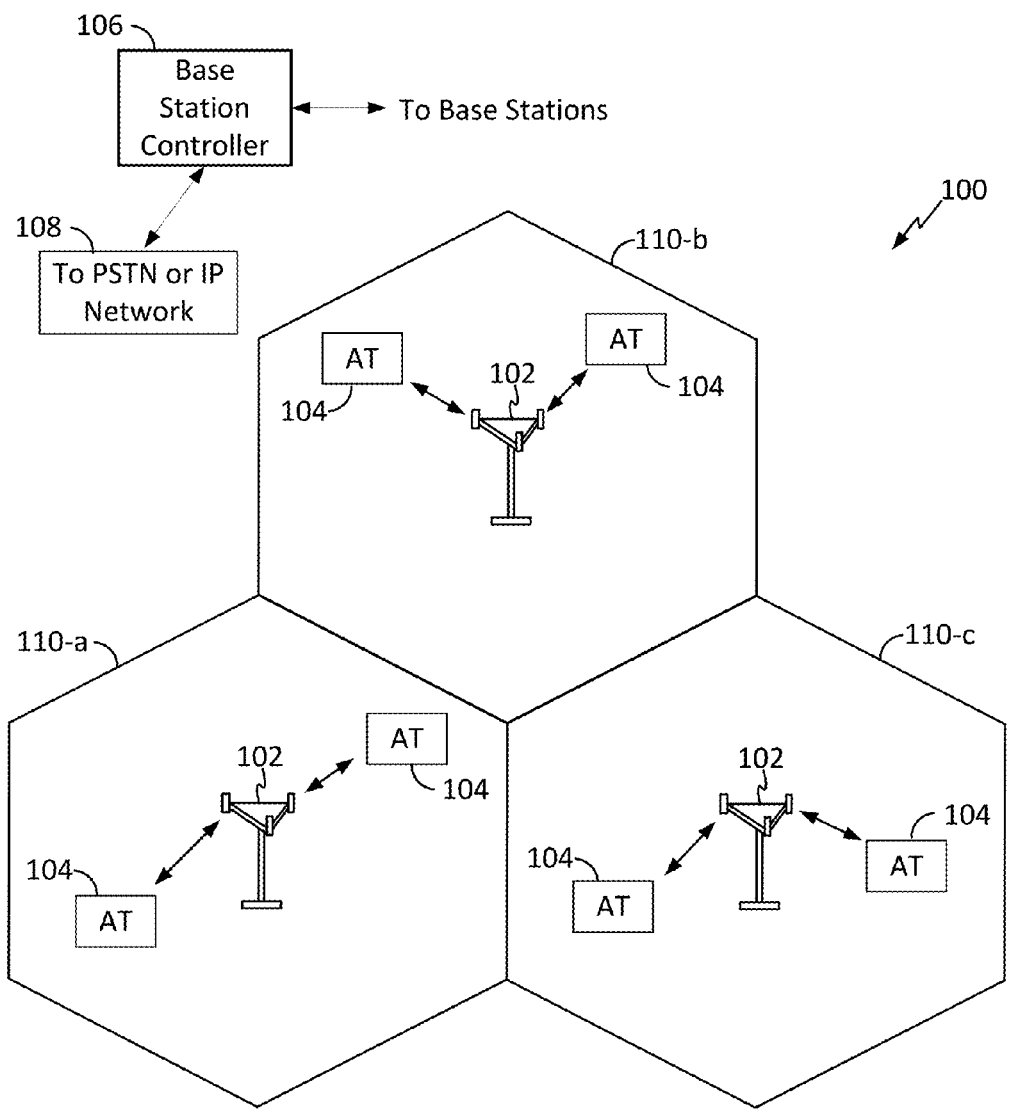
FIG. 1 is a block diagram illustrating an example of a network environment in which one or more aspects of the present disclosure may find application.

FIG. 1 is a block diagram illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106 via one or more carriers. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

One or more access terminals 104 may be dispersed throughout the coverage areas 110, and may wirelessly communicate with one or more sectors associated with each respective base station 102. An access terminal 104 may generally include one or more devices that communicate with one or more other devices through wireless signals. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. The access terminals 104 may include mobile terminals and/or at least substantially fixed terminals. Examples of access terminals 104 include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

Figure 2:
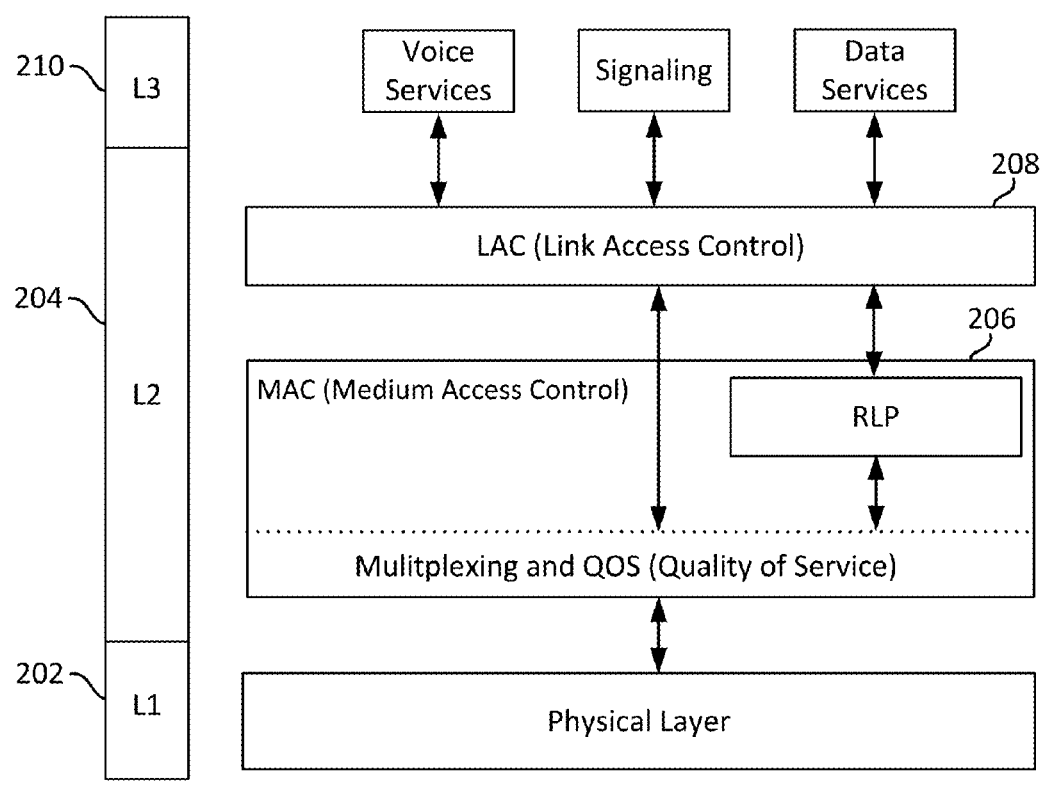
FIG. 2 is a block diagram illustrating an example of a protocol stack architecture which may be implemented by an access terminal according to some embodiments.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

As an access terminal 104 operates within the system 100, the access terminal 104 may employ various modes of operation, including a dedicated mode and an idle mode. In dedicated mode, the access terminal 104 may actively exchange data (e.g., voice or data calls or sessions) with one or more base stations (e.g., base stations 102 in FIG. 1). In idle mode, the access terminal 104 may monitor control channels, such as a paging channel (PCH) for paging messages. Such paging messages may include messages that alert the access terminal 104 to the occurrence of an incoming voice or data call and control/overhead messages that carry system information and other information for the access terminal 104.

When operating in the idle mode, paging messages may be sent on the paging channel to the access terminal 104 at designated time intervals. Instead of monitoring the paging channel continuously, the access terminal 104 can conserve power by periodically monitoring the paging channel in a slotted idle mode, which may also be referred to by those of skill in the art as discontinuous reception mode or DRX mode. In the slotted idle mode, the access terminal 104 wakes up from a "sleep" state at known time intervals, enters an "awake" state and processes the paging channel for messages. If additional communication is not required, the access terminal 104 can revert back to the sleep state until the next designated time.

Figure 3:
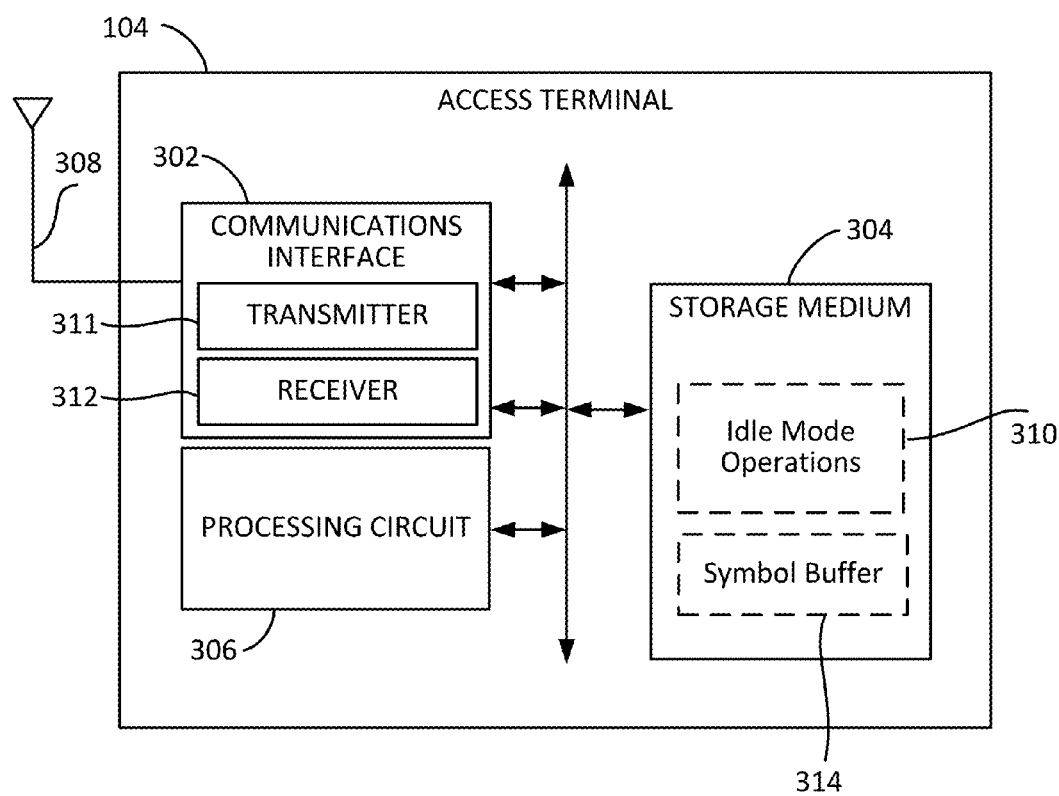
FIG. 3 is a block diagram illustrating select components of an access terminal according to some embodiments.

FIG. 3 shows a block diagram illustrating select components of an access terminal 104 according to at least one example of the present disclosure. The access terminal 104 includes a communications interface 302 and a storage medium 304. These components can be coupled to and/or placed in electrical communications with a processing circuit 306.

The communications interface 302 may be adapted to facilitate wireless communications of the access terminal 104. For example, the communications interface 302 may include circuitry and/or programming adapted to facilitate the communication of information bi-directionally with respect to one or more communications devices in a network. The communications interface 302 may be coupled to one or more antennas 308 for wireless communications within a wireless communications system. The communications interface 302 can be configured with one or more standalone receivers 312 and/or transmitters 311, as well as one or more transceivers. In at least one example, the receiver 312 may be a rake receiver. Further, in at least one example, the rake receiver may include one or more fingers, each capable of being configured to communicate with a different cell 110-a, 110-b, or 110-c.

The storage medium 304 may represent one or more computer-readable, machine-readable, and/or processor-readable devices for storing programming, such as processor executable code or instructions (e.g., software, firmware), electronic data, databases, or other digital information. The storage medium 304 may also be used for storing data that is manipulated by the processing circuit 306 when executing programming. The storage medium 304 may be any available media that can be accessed by a general purpose or special purpose processor, including portable or fixed storage devices, optical storage devices, and various other mediums capable of storing, containing or carrying programming. By way of example and not limitation, the storage medium 304 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 304 may be coupled to the processing circuit 306 such that the processing circuit 306 can read information from, and write information to, the storage medium 304. That is, the storage medium 304 can be coupled to the processing circuit 306 so that the storage medium 304 is at least accessible by the processing circuit 306, including examples where at least one storage medium is integral to the processing circuit 306 and/or examples where at least one storage medium is separate from the processing circuit 306 (e.g., resident in the access terminal 104, external to the access terminal 104, distributed across multiple entities).

Programming stored by the storage medium 304, when executed by the processing circuit 306, causes the processing circuit 306 to perform one or more of the various functions and/or process steps described herein. For example, the storage medium 304 may include idle mode operations 310 adapted for regulating operations at one or more hardware blocks of the processing circuit 306, regulating power to one or more hardware blocks of the processing circuit 306, and/or regulating a sequence of operations when in idle mode, as described in further detail below. The idle mode operations may include programming implemented at any suitable layer of the protocol stack architecture depicted in FIG. 2. In addition, in at least one example, the storage medium 304 may include a symbol buffer 314 for storing page messages received from a cell other than the active cell during idle mode operations.

The processing circuit 306 is generally adapted for processing, including the execution of such programming stored on the storage medium 304. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 306 is arranged to obtain, process and/or send data, control data access and storage, issue commands, and control other desired operations. The processing circuit 306 may include circuitry configured to implement desired programming provided by appropriate media in at least one example. For example, the processing circuit 306 may be implemented as one or more processors, one or more controllers, and/or other structure configured to execute executable programming. Examples of the processing circuit 306 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 306 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 306 are for illustration and other suitable configurations within the scope of the present disclosure are also contemplated.

According to one or more aspects of the present disclosure, the processing circuit 306 may be adapted to perform any or all of the features, processes, functions, steps and/or routines for any or all of the access terminals 104 described herein. As used herein, the term "adapted" in relation to the processing circuit 306 may refer to the processing circuit 306 being one or more of configured, employed, implemented, and/or programmed to perform a particular process, function, step and/or routine according to various features described herein.

Figure 4:
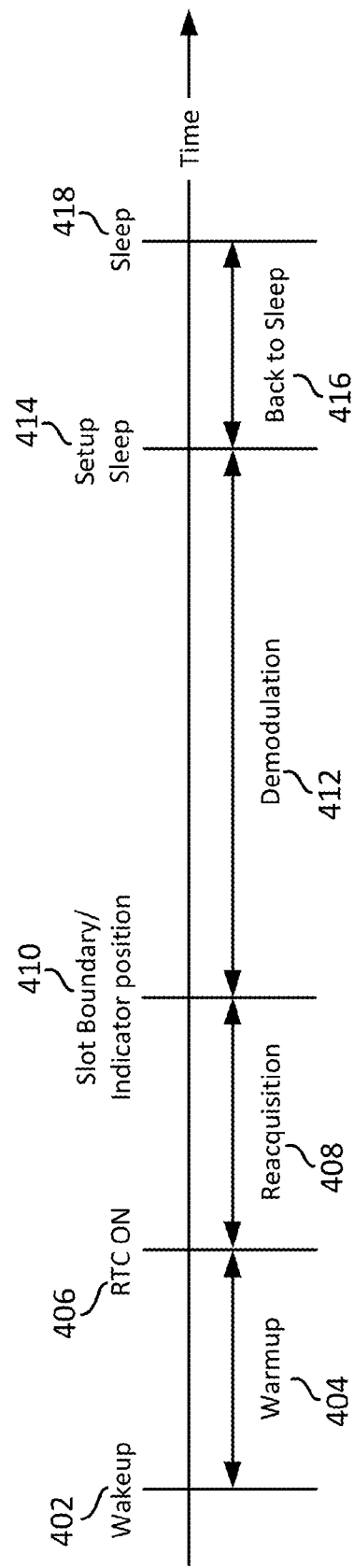
FIG. 4 is a schematic diagram illustrating a problem scenario according to some embodiments.

As briefly described above, the access terminal 104 may be configured to operate in a slotted idle mode. Here, the slotted mode may include various different procedures and protocols according to various implementation details. FIG. 4 shows a timing diagram depicting at least one example of some of the operations performed by an access terminal 104 when operating in the slotted idle mode. At a time prior to the time interval when the access terminal 104 is expected to be monitoring and processing transmissions, with timing generally corresponding to a selected Slot Cycle Index (SCI), the access terminal 104 wakes up at 402 and begins warming up one or more receiver components at 404 (e.g., one or more receiver components of the communications interface 302 and/or one or more hardware blocks of the processing circuit 306). After the warm-up period 404, the receiver can be powered ON at 406 and the access terminal 104 may perform a reacquisition of the base station at 408. This reacquisition 408 can include reacquisition of a pilot signal to determine factors such as timing synchronization, and which multipath pilot signal is the strongest. In this example, the results from the reacquisition 408 can be employed for processing transmissions received during the slot period.

At 410, the beginning of the slot may be identified by an indicator at the slot boundary and the access terminal 104 receives and demodulates 412 any received transmissions (e.g., any received general page messages (GPMs). The demodulation 412 may include collection of samples for a single path of a multipath signal that was determined to be the strongest path in the reacquisition 408. Symbols are extracted from the collected samples, to process the symbols and obtain a general page message (GPM).

If a general page message (GPM) includes a page intended for the receiving access terminal 104, the access terminal 104 can further communicate with the base station 102 to complete any requested operations. Otherwise, the access terminal 104 demodulates all received general page messages (GPMs) until an empty general page message (GPM) is received. As noted above, the empty general page message (GPM) may serve as an indicator that the access terminal 104 can return to the sleep state of the slotted idle mode. Accordingly, at step 414, the access terminal 104 can initiate sleep setup to begin putting the access terminal 104 back into the sleep state of the slotted idle mode 416. Finally, at 418, the access terminal is returned to the sleep state and may remain in the sleep state until the next scheduled slot.

While operating in the slotted mode, when an access terminal 104 attempts to reacquire the serving cell, the access terminal 104 may first search for the best path, and then may attempt to decode any page message utilizing that best path. Here, when the access terminal 104 is in its idle mode, the access terminal's active set contains only one cell. However, when the access terminal 104 is within an area of overlapping cells or under fading channel conditions, while decoding a page message there is a possibility that the signal energy from the serving cell may become degraded, and the access terminal 104 may accordingly fail to decode the page from its serving cell.

Figure 5:
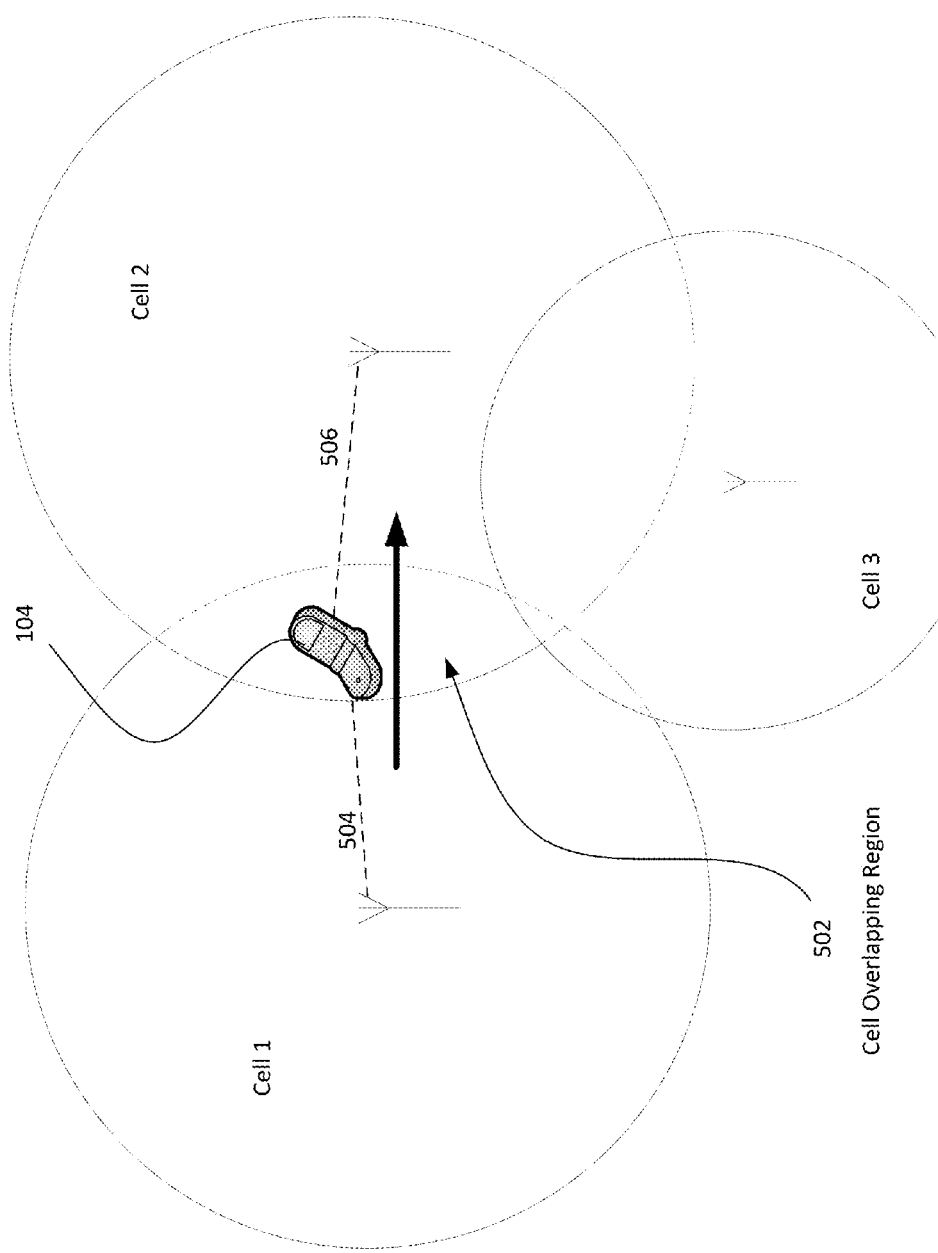
FIG. 5 is an exemplary illustration further illustrating the problem scenario of FIG. 4 according to some embodiments.

FIG. 5 is a schematic diagram illustrating this problem scenario according to one example. In this illustration, the access terminal 104 is on the move as indicated in the arrow pointing to the right while in the slotted mode. In another example, the access terminal 104 may be stationary while transmission conditions are changing around the access terminal 104 due to one or more events (such as system errors, system load, power conditions, etc.) at the transmission stations. At this time, the access terminal 104 is connected to an active cell, Cell 1, through a communication link 504 via a receiver.

During wake up 402, the access terminal 104 may see a relatively good signal quality (e.g., a relatively high value of Ec/Io) from its active serving cell Cell 1. Further, the access terminal 104 may see slightly less signal quality (e.g., a relatively lower value of Ec/Io) from the neighbor cell labeled Cell 2 as compared to its serving cell Cell 1. Thus, the cell labeled Cell 2 bay be in the access terminal's neighbor set. Here, the cell labeled Cell 3 may also be within the access terminal's neighbor set.

In conventional systems, based on the measurements made at wake up 402, the access terminal 104 generally only attempts to decode pages from its serving cell Cell 1. In the described scenario, however, during the duration of the page slot, because the access terminal 104 is moving away from the coverage area of its active cell, the signal quality (e.g., the Ec/Io) for the serving cell Cell 1 may fall. Here, if the signal quality from the serving cell Cell 1 falls by a substantial amount, the access terminal 104 may fail to decode a page message transmitted from its serving cell Cell 1.

Although the signal quality from Cell 1 may be the strongest at wake up 402, due to the movement of the access terminal 104 illustrated in FIG. 5 (or for any other reason such as changing channel conditions), the strongest signal quality during the demodulation period 412 might actually be from the neighbor cell Cell 2. However, even though the neighbor cell Cell 2 is transmitting the same page message for the access terminal 104, a conventional access terminal does not decode page messages transmitted from neighbor cells (e.g., Cell 2 in this example). Thus, if the signal quality from the serving cell Cell 1 is substantially degraded, the access terminal accordingly may miss the page message and may experience a mobile terminated call connection failure.

Therefore, in accordance with one or more aspects if the disclosure, described in further detail below, a communication link 506 may be established with a neighboring cell, for example, Cell 2 in FIG. 5. In this way, the page message transmitted by the neighbor cell Cell 2 may be available for decoding at the access terminal 104 in the case that the page message from its serving cell Cell 1 is missed.

In one example, the neighboring cell, Cell 2, from which paging information may be received, may be selected from a set of neighboring cells (e.g., Cell 2, Cell 3) based on one or more parameters or characteristics of a signal received from neighboring cells, such as a received signal strength indicator (RSSI), Ec/Io, Eb/No, Signal-To-Noise Ratio (SNR), channel conditions, channel interference, signal characteristics, etc.

Ina further aspect of the disclosure, during the movement from one location to another, the access terminal 104 may reach a cell overlapping region 502 in which Ec/Io of the active cell, Cell 1, has degraded. However, it is possible that in the cell overlapping region 502, the Ec/Io of the neighboring cell, Cell 2, has increased. In this exemplary condition, it may be that the access terminal 104 receives one or more paging messages from its active cell, Cell 1, but the access terminal 104 fails to decode the paging message(s). Thus, in accordance with an aspect of the disclosure, the access terminal 104 may receive paging information or symbols from one or more neighbor cells, e.g., Cell 2, in parallel to receiving paging messages from the active cell, Cell 1. In this exemplary scenario, if the access terminal 104 fails to decode paging messages from Cell 1, the access terminal 104 may attempt to decode paging messages from the paging information or symbols received from Cell 2. In a further aspect of the disclosure, if the access terminal 104 successfully decodes paging messages from the paging information or symbols received from Cell 2, an idle handover to Cell 2 may be performed.

Figure 6:
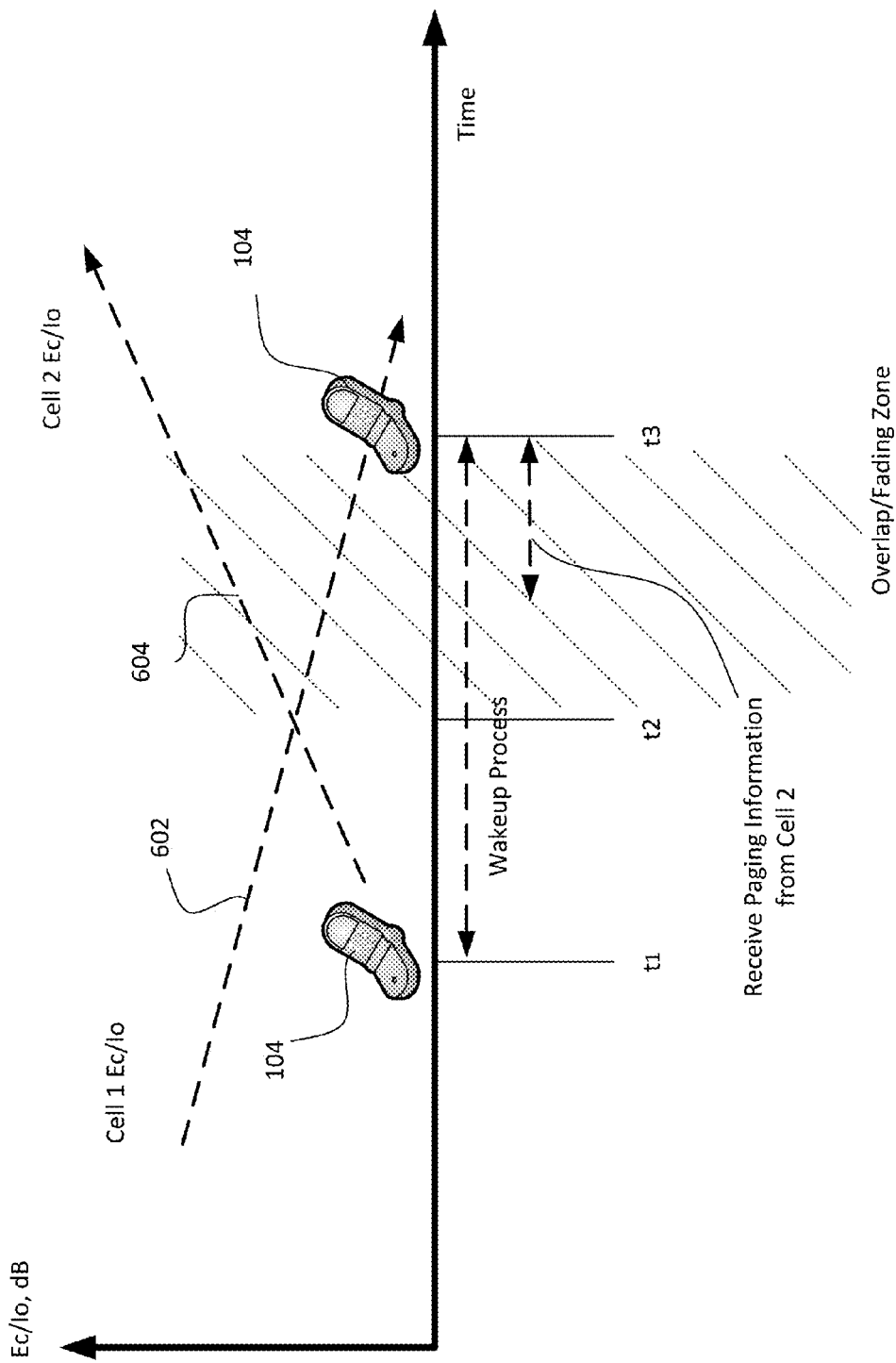
FIG. 6 is a timing diagram illustrating at least one example of some operations performed by an access terminal when monitoring a paging channel (PCH) in slotted idle mode according to some embodiments.

FIG. 6 is a timing chart further illustrating this problem scenario. In this illustration, the line 602 sloping downward schematically illustrates the gradually decreasing signal quality (e.g., low Ec/Io) of the serving or active cell Cell 1; and the line 604 sloping upward schematically illustrates the gradually increasing signal quality (Ec/Io) of the neighbor cell Cell 2. In another example, the line 604 may represent a constant signal quality of the neighboring cell Cell 2.

Here, time t1 may correspond to a wakeup time 402 or a warmup period 404 (referring to FIG. 404). In an aspect of the disclosure, the active cell may be selected according to the best Ec/Io cell at that moment, which is Cell 1 in FIGS. 5 and 6. As can be seen here, in cell boundary conditions or fading channel conditions, it may be the case that even though during a warm-up period 404 (e.g., at time t1) a re-acquisition may have succeeded on the active Cell 1, as the access terminal 104 moves away from Cell 1 and towards Cell 2, the signal quality corresponding to Cell 1 may fall below that of Cell 2 (e.g., at time t2). In this case, within the demodulation/decoding period 412 (e.g., at time t3), the signal quality of the neighbor cell Cell 2 may be better than that of the active cell Cell 1. Thus, it may be possible that while a decoding failure may occur on the active cell Cell 1, the access terminal 104 may be capable of decoding the page message from the paging information received from the neighbor cell Cell 2.

Thus, one or more aspects of the present disclosure may take advantage of known network behavior (e.g., the transmission of paging information from one or more cells in addition to the active cell) to improve the probability of receiving incoming page messages. For example, an access terminal 104 configured according to some aspects of the disclosure may dedicate a suitable number of receivers to track its neighbor paths to decode page messages while the access terminal 104 is within a cell overlap region and/or fading conditions. In one example, the receivers may be fingers of a rake receiver 312 (referring to FIG. 3). In another example, the receivers may be independent radio receivers of any type so long as they can receive wireless data in the same or similar way as rake receivers. In one example that includes the use a rake receiver 312, up to a maximum of two fingers of a rake receiver may be dedicated or allocated to track neighboring cells. However, in other examples, the number of fingers may be varied based on total number of rake receiver fingers in the access terminal 104.

The allocated receivers (e.g., one or more fingers of a rake receiver 312 in one example) may receive and store neighbor cell-tracking rake receiver symbols, such that the access terminal 104 can accordingly process the stored symbols offline to extract a received page message in the case that the access terminal 104 fails to decode pages from its serving cell Cell 1. In one or more aspects of the present disclosure, the term "offline" as used herein means that the page messages from received symbols are decoded at a later time that occurs at least after the time when the access terminal 104 fails to decode page messages form the serving cell Cell 1.

In one nonlimiting example, an access terminal 104 configured according to some aspects of the present disclosure may support eight receivers/fingers of the rake receiver 312. When this access terminal 104 is located in a cell boundary area, that access terminal 104 may not necessarily use all of its fingers to track paths corresponding to its active cell; thus, allocating, for example, two of the fingers for detecting pilot paths from the strongest neighbor cell may have little or no impact on decoding performance of the active cell. In one example, this allocation of fingers for tracking neighboring cells may be dynamic; that is, the number of receivers/fingers allocated to track neighboring cells may change based on number of receivers/fingers used for optimum decoding performance of the active cell.

In a further aspect of the disclosure, the access terminal 104 may initiate the utilization of this neighbor decoding algorithm based on one or more of the following parameters: active service cell Ec/Io, neighboring cell Ec/Io, relative value of neighboring cell Ec/Io with respect to active service cell Ec/Io, channel conditions such as Rx AGC, channel estimation, knowledge of a given number of cells' overheads, number of active pilot paths, etc. In another example, only Ec/Io values of active and neighboring cells are used to activate the algorithm described in the present disclosure.

Figure 7:
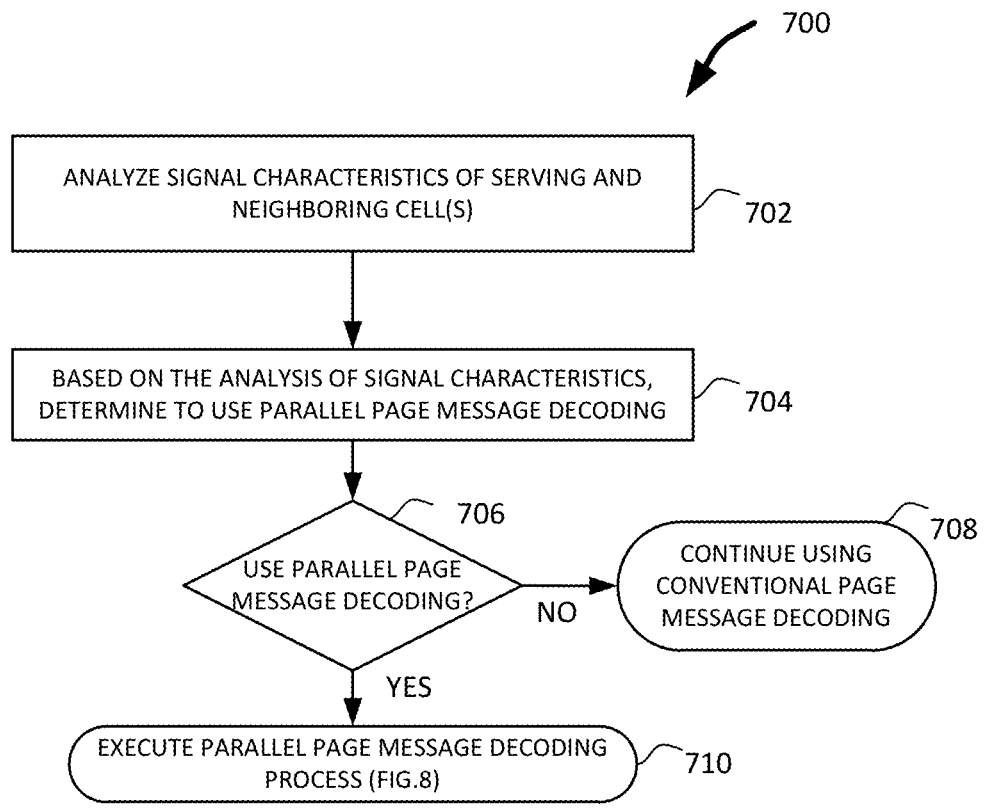
FIG. 7 is a flow chart illustrating decision process for using parallel page decoding in accordance with some embodiments.
Figure 8:
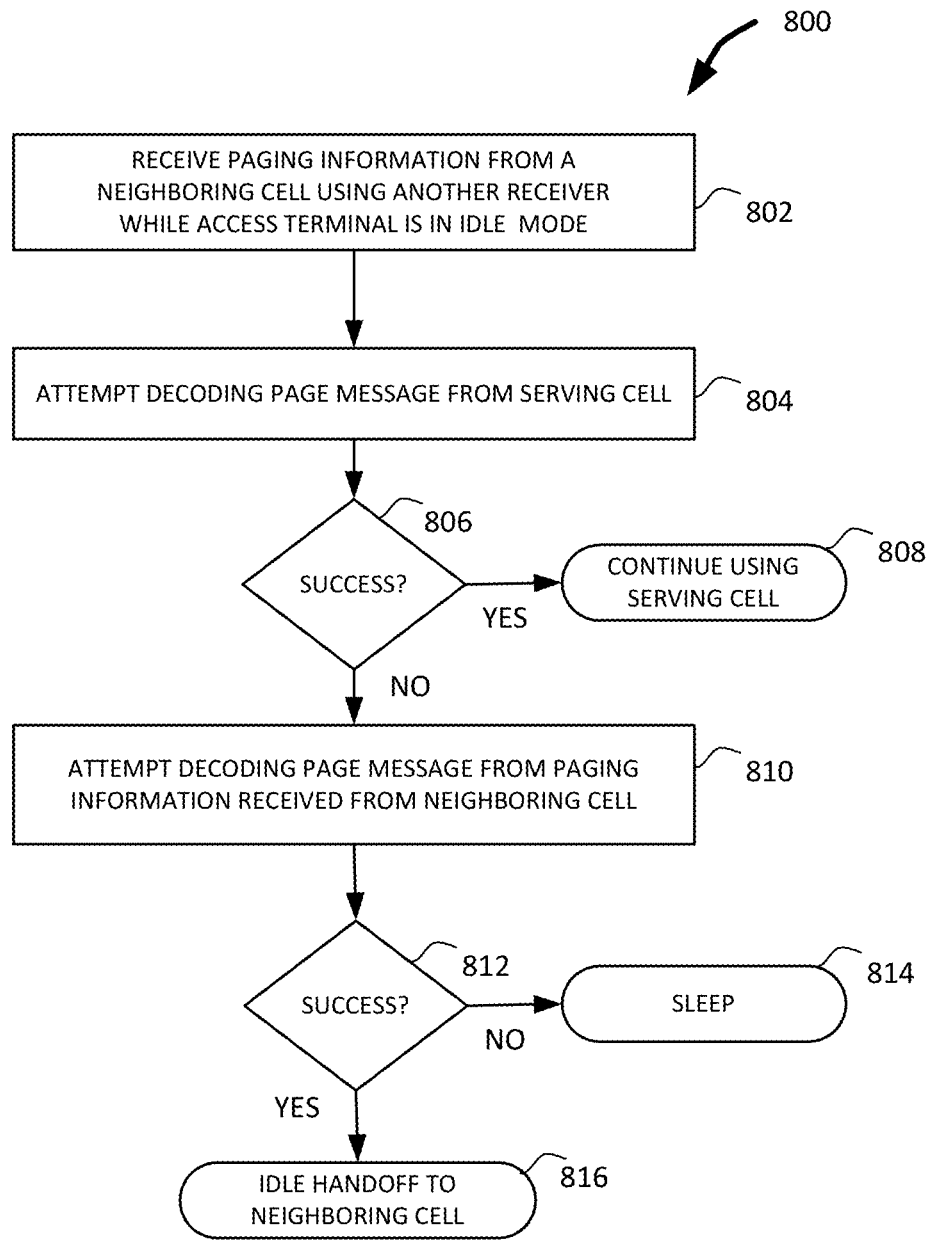
FIG. 8 is a flow chart illustrating a process of parallel page decoding from one or more neighbor cells in accordance with some embodiments.

FIG. 7 and FIG. 8 are flow charts illustrating exemplary processes 700 and 800, each operable at an access terminal 104 in accordance with some aspects of the present disclosure. In some examples, one or more aspects of the processes 700 and 800 may be implemented with suitable software in Layer 1, Layer 2 and/or MDSP firmware at the access terminal 104.

The access terminal 104 may initially determine whether to utilize the parallel decoding algorithm described herein in accordance with one or more factors, as described above. Accordingly, at step 702, the access terminal 104 may analyze one or more parameters such as the active serving cell Ec/Io; Eb/No; the magnitude of the neighbor cell Ec/Io, or relative value of the neighbor cell Ec/Io with respect to the active serving cell Ec/Io; channel conditions (e.g., Rx AGC, channel estimation); knowledge of a given number of cells' overheads; and/or the number of active pilot paths. Subsequently, based on the above analysis, at step 704, the access terminal 104 may initially determine whether to utilize the parallel decoding algorithm described herein in accordance with one or more factors, as described above. At decision step 706 a determination is made whether to use the parallel page message decoding methods according to one or more aspects of the present disclosure. If the access terminal 104 determines not to utilize the parallel decoding process, at step 708, the access terminal 104 may utilize conventional idle/slotted mode operation.

On the other hand, if at decision step 706, the access terminal 104 determines to utilize the parallel decoding process according to an aspect of the present disclosure, at step 710, the access terminal 104 may assign a suitable number, for example, one or two rake receiver fingers to track one or more neighbor cells selected from a neighboring cell set based on one or more parameters stated above, and may proceed to perform the parallel page message decoding process at least one according to the exemplary process depicted in FIG. 8. Some examples may assign only up to a limit or maximum of two fingers to the neighbor cell or cells. Here, one or more remaining fingers of the rake receiver 312 may be utilized as in the conventional slotted mode operation, i.e., to track the active cell.

In one or more aspects of the disclosure, the parallel decoding process entails the access terminal 104 being connected to more than one cell, and receiving symbols therefrom. However, the parallel decoding process described herein does not necessarily involve the notion of parallel computing in which two instructions are computed by two different processors at a same time.

Moving to FIG. 8, upon determining to utilize the parallel decoding algorithm, at step 802, the access terminal 104 may receive paging information from a neighboring cell through a second receiver (e.g., one or more fingers of a rake receiver 312) while access terminal 104 is in idle mode and connected to the serving cell and receiving page messages. The term "paging information", in one example, means symbols representing page messages from a cell. Still further, at step 802, the access terminal 104 may receive the demodulated symbols received from the neighbor cell to which the one or two rake receiver fingers were assigned, and may store this received paging information in a separate symbols buffer (e.g., at the symbol buffer 314 in the storage medium 304). In a further aspect of the disclosure, the output of the neighbor cell-assigned fingers is not combined with the output of the serving cell-assigned fingers, so their output will not disturb the existing serving cell multipath symbol combiner.

At step 804, the access terminal 104 may attempt to decode a page message received from the active cell. At decision step 806, a determination is made if the access terminal 104 successfully decoded a page message received from the active cell. For example, before going to sleep, the access terminal 104 may check whether layer 1 or layer 2 software reported any bad CRCs, and have not decoded a mobile terminal directed page. If success was achieved, then the process may proceed to step 808, and the access terminal 104 may stop collecting symbols from the neighbor cell and continue as in a conventional procedure, e.g., by continuing with a mobile terminated call according to the received page message.

On the other hand, if at decision step 806 it is determined that the access terminal 104 could not successfully decode a page message from the active cell (e.g., if layer 1 or layer 2 reported a bad CRC), then the process may proceed to step 810, wherein the access terminal 104 may decode the received paging information received from the neighbor cell. For example, the access terminal 104 may feed the stored samples obtained from the output of the neighbor cell-assigned fingers into a hardware engine (e.g., a deinterleaver and decoder), and may extract signaling messages.

At step 812, the access terminal 104 may determine whether the decoded message includes an access terminal-directed page. If no, at step 814, the access terminal 104 may enter a sleep state. On the other hand, if the paging information received from the neighbor cell was successfully decoded in step 810, then the process may proceed to step 816, wherein the access terminal 104 may perform an idle handoff to the strongest neighbor cell, and may thereafter process a mobile terminated call according to the received page message.

By utilizing various aspects of the present disclosure, mobile terminated call success rates may improve when an access terminal 104 configured according to aspects of the present disclosure is located in overlapping cell regions and/or fading channel regions. Furthermore, access terminal 104 receiver performance may be improved when the access terminal 104 is in idle mode.

Aspects of the disclosure may be enabled for all QPCH-to-IS2000 transfer cases. In this way, a network operator may be enabled to ensure that the access terminal 104 can decode pages for all QPCH enabled cases. Among others, one or more aspects of the present disclosure provide better performance in devices whose RF performance is slightly low.

Furthermore, various aspects of the present disclosure may reduce the missing of mobile terminated call pages, and thus can improve the mobile terminated call connection performance in areas of marginal signal quality, and cell boundary areas.

While the above discussed aspects, arrangements, and embodiments are discussed with specific details and particularity, one or more of the components, steps, features and/or functions illustrated in FIGS. 1-7 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 2 and 3 may be configured to perform or employ one or more of the methods, features, parameters, or steps described in FIGS. 6 and/or 7. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

We claim:

1. A method of wireless communication operable at an access terminal in idle mode, the method comprising:
    initiating a parallel page decoding process based on one or more parameters comprising at least one of an active service cell signal quality, a neighboring cell signal quality, a relative value of a neighboring cell signal quality with respect to an active service cell signal quality, channel conditions, a channel estimation, cells overheads, or a number of active pilot paths;
    allocating a second finger of a rake receiver in the access terminal to track a neighboring cell while a first finger of the rake receiver in the access terminal is configured to receive paging information from an active cell;
    utilizing the second finger, receiving paging information from the neighboring cell in parallel with the receiving of the paging information from the active cell;
    attempting to decode paging information, comprising a page message, received from the active cell;
    if the access terminal fails to decode the page message from the received paging information from the active cell, decoding a page message from the parallelly received paging information from the neighboring cell; and
    if the access terminal determines that the decoded page message from the neighboring cell includes an access terminal directed page, performing an idle handoff to the neighboring cell for processing a mobile terminated call.

2. The method of claim 1, further comprising performing an idle handoff to the neighboring cell.

3. The method of claim 1, wherein the neighboring cell is selected from a neighboring cell set based on a signal strength.

4. The method of claim 1, wherein the second finger is configured to track the neighboring cell in cell fading condition regions based on at least one of:
    neighboring cell signal quality, relative value of the neighboring cell signal quality with respect to the active cell signal quality, channel conditions, channel estimation, knowledge of a given number of overheads of the neighboring cell, or a number of active pilot paths.

5. The method of claim 1, wherein the paging information received from the neighboring cell is stored in a separate symbols buffer.

6. An access terminal configured for wireless communication, comprising:
    at least one processing circuit;
    a communication interface communicatively coupled to the at least one processing circuit; and
    a storage medium communicatively coupled to the at least one processing circuit,
    wherein the at least one processing circuit is configured to:
    initiate a parallel page decoding process based on one or more parameters comprising at least one of an active service cell signal quality, a neighboring cell signal quality, a relative value of a neighboring cell signal quality with respect to an active service cell signal quality, channel conditions, a channel estimation, cells overheads, or a number of active pilot paths;
    allocate a second finger of a rake receiver in the access terminal to track a neighboring cell while a first finger of the rake receiver in the access terminal is configured to receive paging information from an active cell;
    utilize the second finger to receive paging information from the neighboring cell in parallel with the receiving of the paging information from the active cell;
    attempt to decode paging information, comprising a page message, received from the active cell;
    if the access terminal fails to decode the page message from the received paging information from the active cell, decode a page message from the parallelly received paging information from the neighboring cell; and
    if the access terminal determines that the decoded page message from the neighboring cell includes an access terminal directed page, perform an idle handoff to the neighboring cell for processing a mobile terminated call.

7. The access terminal of claim 6, wherein the at least one processing circuit is further configured to perform an idle handoff to the neighboring cell.

8. The access terminal of claim 6, wherein the at least one processing circuit is further configured to select the neighboring cell from a neighboring cell set based on a signal strength.

9. The access terminal of claim 6, wherein the at least one processing circuit is further configured to cause the second finger to track the neighboring cell in cell fading condition regions based on at least one of: neighboring cell signal quality, relative value of the neighboring cell signal quality with respect to the active service cell signal quality, channel conditions, channel estimation, knowledge of a given number of overheads of the neighboring cell, or a number of active pilot paths.

10. The access terminal of claim 6, wherein the at least one processing circuit is further configured to store the paging information received from the neighboring cell in a separate symbols buffer.

11. A non-transitory computer readable storage medium comprising a program which, when executed by a processor, performs an operation, the operation comprising:
    initiating a parallel page decoding process based on one or more parameters comprising at least one of an active service cell signal quality, a neighboring cell signal quality, a relative value of a neighboring cell signal quality with respect to an active service cell signal quality, channel conditions, a channel estimation, cells overheads, or a number of active pilot paths;

allocating a second finger of a rake receiver in an access terminal to track a neighboring cell while a first finger of the rake receiver in the access terminal is configured to receive paging information from an active cell;

utilizing the second finger, receiving paging information from the neighboring cell in parallel with the receiving of the paging information from the active cell;

attempting to decode paging information, comprising a page message, received from the active cell;

if the access terminal fails to decode the page message from the received paging information from the active cell, decoding a page message from the parallelly received paging information from the neighboring cell; and if the access terminal determines that the decoded page message from the neighboring cell includes an access terminal directed page, performing an idle handoff to the neighboring cell for processing a mobile terminated call.

12. The non-transitory computer readable storage medium of claim 11, wherein the operation further comprises performing an idle handoff to the neighboring cell.

13. The non-transitory computer readable storage medium of claim 11, wherein the neighboring cell is selected from a neighboring cell set based on a signal strength.

14. The non-transitory computer readable storage medium of claim 11, wherein the operation further comprises causing the second finger to track the neighboring cell in cell fading condition regions based on at least one of: neighboring cell signal quality, relative value of the neighboring cell signal quality with respect to the active cell signal quality, channel conditions, channel estimation, knowledge of a given number of overheads of the neighboring cell, or a number of active pilot paths.

15. The non-transitory computer readable storage medium of claim 11, wherein the paging information received from the neighboring cell is stored in a separate symbols buffer.

16. An access terminal configured for wireless communication, comprising:

means for initiating a parallel page decoding process based on one or more parameters comprising at least one of an active service cell signal quality, a neighboring cell signal quality, a relative value of a neighboring cell signal quality with respect to an active service cell signal quality, channel conditions, a channel estimation, cells overheads, or a number of active pilot paths;

means for allocating a second finger of a rake receiver in the access terminal to track a neighboring cell while a first finger of the rake receiver in the access terminal is configured to receive paging information from an active cell;

means for utilizing the second finger to receive paging information from the neighboring cell in parallel with the receiving of the paging information from the active cell;

means for attempting to decode paging information, comprising a page message, received from the active cell;

means for, if the access terminal fails to decode the page message from the received paging information from the active cell, decoding a page message from the parallelly received paging information from the neighbor cell; and means for, if the access terminal determines that the decoded page message from the neighboring cell includes an access terminal directed page, performing an idle handoff to the neighboring cell for processing a mobile terminated call.

17. The access terminal of claim 16, further comprising means for performing an idle handoff to the neighboring cell.

18. The access terminal of claim 16, further comprising means for selecting the neighboring cell from a neighboring cell set based on a signal strength.

19. The access terminal of claim 16, further comprising means for causing the second finger to track the neighboring cell in cell fading condition regions based on at least one of: neighboring cell signal quality, relative value of the neighboring cell signal quality with respect to the active service cell signal quality, channel conditions, channel estimation, knowledge of a given number of overheads of the neighboring cell, or a number of active pilot paths.

20. The access terminal of claim 16, further including means for storing the paging information received from the neighboring cell in a separate symbols buffer.

* * * * *